Patented Feb. 15, 1949

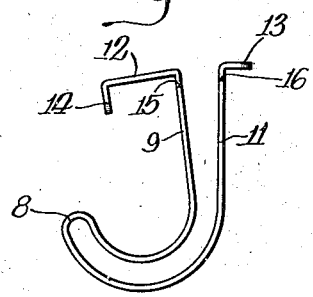
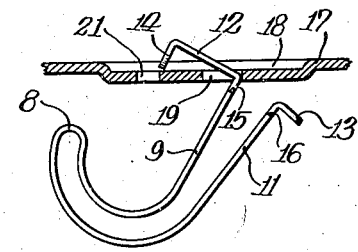
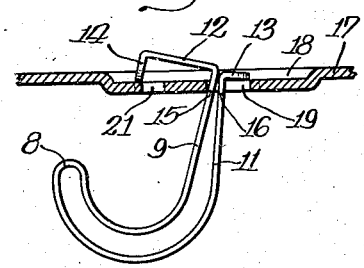
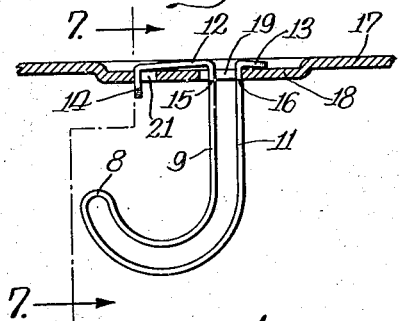
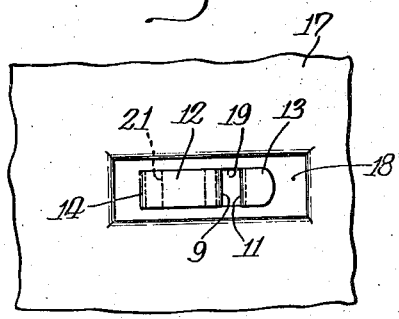
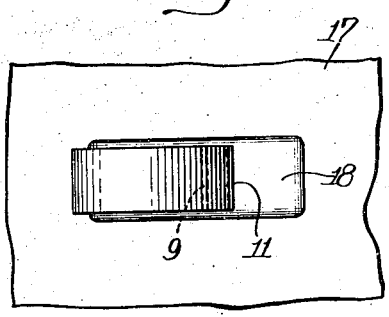
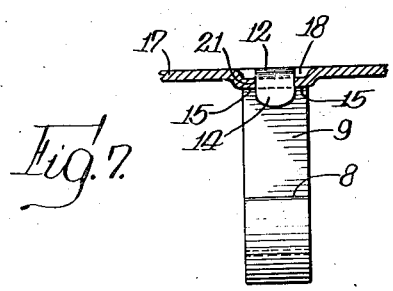

2,461,936

UNITED STATES PATENT OFFICE 2,461,936

MOUNTING FOR HOOKS AND THE LIKE

Roy A. Stone, Rockford, Ill., assignor to National Lock Company, Rockford, Ill., a corporation of Delaware Application June 6, 1945, Serial No. 597,803

4 Claims. (Cl. 248—220)

This invention pertains to the mounting on a wall of metal hooks or similar articles, and more specifically is concerned with the portions of such article and the supporting wall which cooperate in the attachment of the article to the wall.

One of the primary purposes of my invention is to provide a mounting by which a hook or the like may be attached to a wall without the employment of screws, nails or other fastening devices structurally independent of the article.

Another object is to so construct the article and the wall to which it is attached that the assembly may be effected without the employment of any tools, and which in the event of breakage or damage may be disassembled when occasion requires.

A further object is to provide an article which will be strong and durable and which when mounted on the wall will remain immovably attached thereto and will not be loosened by any pull on the article, such as by the weight of an object suspended from the article.

Other objects and advantages of my invention should be readily appreciated as the same becomes better understood by reference to the following description when considered in connection with the accompanying drawing.

Referring to the drawing,

Fig. 1 is a side elevation of a hook constructed in accordance with my invention;

Fig. 2 illustrates the first step in attaching the hook shown in Fig. 1 to a wall, which is shown in section;

Fig. 3 is a view similar to Fig. 2 showing the next step in the mounting of the hook;

Fig. 4 is a similar view showing the hook in completely mounted position;

Fig. 5 is a top plan view of the assembly shown in Fig. 4;

Fig. 6 is a bottom view thereof; and

Fig. 7 is a view taken on the line 7—7 of Fig. 4.

Referring now to the drawing more in detail, it will be observed that the article which I have chosen to illustrate as embodying the principles of my invention consists of a hook which may be of any desired size, such, for instance, as a small hook adapted to support a cup or other light article in a metal china cabinet or kitchen cabinet, or a heavy hook, such as a clothes hook, or any other size and character of hook which may be advantageously mounted in the manner illustrated. It should be understood, however, that my invention is not limited to the mounting of hooks, but may be utilized in the mounting of various articles of a similar nature.

From the drawing it will be apparent that the article, which in this instance is a hook, is formed of a strip of sheet metal reversely bent at the point 8 to form the tip of the hook and provide a pair of divergent resilient legs 9 and 11, the normal position of which is shown in Fig. 1.

Near their free ends the legs are reduced in width by removing the margins, and the thus formed narrow portions are bent in opposite directions to provide on the leg 9 an elongated flange or arm 12, and upon the leg 11 an oppositely extending flange 13. The extremity of the flange 12 is down-turned, as indicated at 14, providing a lip which assists in maintaining the assembled relation of the parts, as will later be apparent. The reduction in width of the leg extremities results in the provision at each side of leg 9 of shoulders 15, and similarly on leg 11 the provision of shoulders 16.

The wall on which the article is to be mounted, and which is preferably made of sheet metal, is designated by reference character 17, and may form a shelf or it may be part of the body structure of a metal cabinet or compartment. The wall, whatever its function, is preferably stamped to provide a depression 18 of a depth at least equal to the thickness of the material from which the hook is formed, so that the hook anchor parts will not project above the top of the wall. The provision of such groove, however, is not in all cases essential. The wall, whether grooved or not, is provided with a plurality of openings 19 and 21 spaced apart and of a width to permit the projection of the anchoring parts 12 and 13 therethrough.

In mounting the hook or other article on the wall, the arm 12 is first projected upwardly through the opening 19, as illustrated in Fig. 2, whereupon the legs 9 and 11 are pinched together to enable the projection of the flange 13 upwardly through the opening, as illustrated in Fig. 3. Release of the legs will then permit their separation to project the flange 13 over the margin of the opening. The lip 14 is now extended downwardly through the opening 21, while the flanges 12 and 13 constituting the anchoring members are disposed above and supported by the wall. The shoulders 15 and 16 on the legs, being engaged with the under face of the wall, it will be apparent that the article is securely locked against accidental dislodgement and can be detached from the wall only by first pinching the legs 9 and 11 together and reversing the steps followed in the assembly.

It will be apparent that the article is rigidly sustained in its mounted position, irrespective of any pull which may be exerted thereon. For instance, if a weight be hung on the hook 8, the hook cannot tilt because the shoulder 16 will prevent upward movement of the leg 11 and downward movement of the leg 9 is prevented by the anchor arm 12. So also sliding movement of the hook to the right, viewing Fig. 4, as the result of impact or pressure applied to the hooked portion is limited by engagement of the lip 14 with the side of the opening 21, so that the leg 11 will not be compressed against the leg 9 to permit sliding movement of the hook on its support. Manifestly, therefore, while the article can be quickly and easily mounted on the wall without the employment of structurally independent fastening means such as bolts, nails or screws and without the use of any special tools, the assembly when once made is strong, durable and permanent, and can be dismantled only by pinching the hook legs together and then tilting the hook to retract the flange 13 through the opening 19.

A hook or other article made in accordance with my invention is strong and durable, and being made out of one piece of sheet metal can be economically produced by stamping operations and can be quickly mounted with slight labor cost.

The size, shape and proportion of the various parts may obviously be varied within considerable limits without exceeding the scope of the invention as defined in the appended claims.

I claim:

1. An article adapted to be mounted on a member having a pair of apertures of predetermined dimensions and spaced a predetermined distance apart, comprising, a resilient sheet metal strip formed to provide a utility body portion and a pair of resilient legs extending in substantially the same general direction, each of said legs, at places spaced substantially equal distances from its free end, having a pair of oppositely directed shoulders adapted to engage one surface of said member adjacent to opposite margins of one aperture, said shoulders extending from the side edges of the legs in substantially parallel relationship to one another, each of said legs from its shoulders to its free end providing an extension and being of a width, measured parallel to its shoulders, substantially equal to and not greater than the dimension of said aperture measured between said margins thereof, each leg extension being formed with a part extending away from the other leg substantially at a right angle and at a place spaced from its shoulders a distance substantially equal to the thickness of said member adjacent to said aperture thereby to lie closely adjacent to the other surface of said member, one of said leg extensions being formed with an angular part at its free end for disposal in the other aperture when its first said part lies closely adjacent to said other surface of said member.

2. The combination with a wall provided with an elongated depression in one face thereof and a pair of apertures located in said depression and spaced apart longitudinally of said depression by a predetermined distance, of an article having a pair of resilient and normally spaced apart legs each of which is provided with a projection extending at an angle less than a straight angle to its leg, said projections extending in substantially opposite directions to one another, one of said projections being longer than the other, said projections being proportioned to be inserted in the order named through one of said apertures from the wall face opposite to that having the depression when said legs are pinched together and being adapted to overlie and rest against the bottom of the depression at the inner side of the wall adjacent to said apertures and form an anchorage for the article when said legs are separated, the longer one of said legs having a portion adapted to project into the other of said apertures, and means integral with each of said legs for abutment against the outer side of the wall at substantially opposite sides of said one aperture when said projections are disposed against the inner side of the wall in said depression.

3. An article adapted to be mounted on a wall provided with an opening, said article comprising a length of resilient metal of greater width than thickness formed to provide a body and a pair of resilient spaced apart legs with their width faces disposed toward one another, said legs having parts reduced in width at each side thereof from places spaced from their free ends to their free ends to provide shoulders adapted to engage the margins of one face of the wall about said opening and with said reduced leg parts projecting through said opening and disposed substantially at right angles with respect to said legs and against the other face of the wall, the vertical distance between the face of each extension at the inside of the angle and the adjacent shoulder of that leg being substantially equal to the wall thickness adjacent to said opening, whereby said article may be anchored to the wall.

4. An article adapted to be mounted on a wall provided with a pair of openings spaced a predetermined distance apart, said article comprising a length of resilient metal of greater width than thickness formed to provide a body and a pair of resilient spaced apart legs with their width faces disposed toward one another, said legs having parts reduced in width at each side thereof from places spaced from their free ends to their free ends to provide shoulders adapted to engage the margins of one face of the wall about one of said openings and with said reduced leg parts projecting through said one opening and disposed substantially at right angles with respect to said legs and against the other face of the wall, the vertical distance between the face of each extension at the inside of the angle and the adjacent shoulder of that leg being substantially equal to the wall thickness adjacent to the said one opening, one of said legs having a portion adapted to enter the other of said openings, whereby said article may be anchored to the wall.

ROY A. STONE.

REFERENCES CITED

The following references are of record in the file of this patent:

UNITED STATES PATENTS

| Number | Name | Date |
|---|---|---|
| Re. 22,564 | Murphy | Nov. 21, 1944 |
| 833,697 | Riefsnyder | Oct. 16, 1906 |
| 1,445,372 | Wagner | Feb. 13, 1923 |
| 1,964,554 | Ball | June 26, 1934 |
| 1,981,973 | Tinnerman | Nov. 27, 1934 |
| 2,058,733 | Smith | Oct. 27, 1936 |
| 2,093,734 | Place | Sept. 21, 1937 |
| 2,201,611 | Del Camp | May 21, 1940 |
| 2,240,225 | Place | Apr. 29, 1941 |
| 2,318,853 | Hall | May 11, 1943 |